V. T. Hall,
Lock Case for Stop Cocks.
No. 89,930.   Patented May 11, 1869.
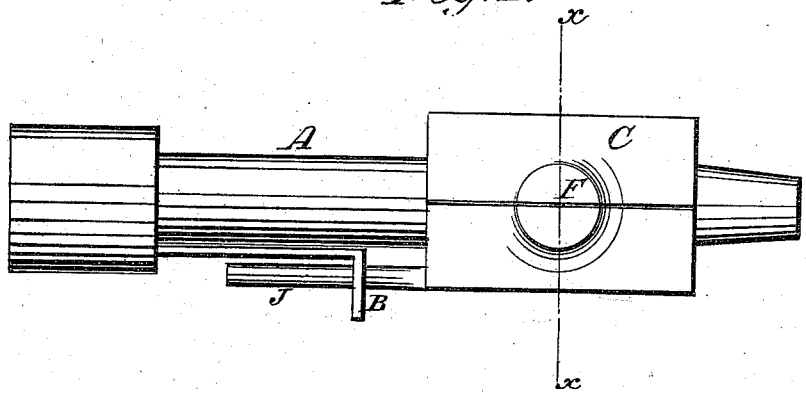
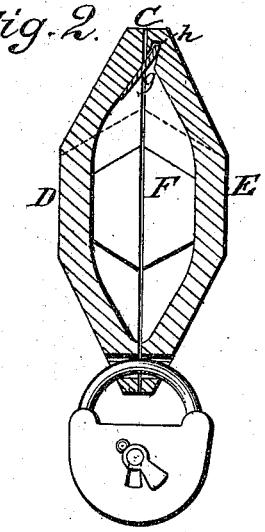
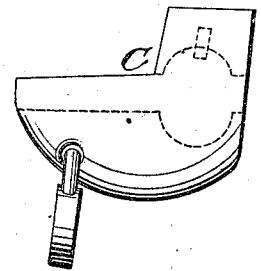
Witnesses.
A. W. Almquist
Wm A Morgan
Inventor.
V. T. Hall
per Munn & Co
Attys.

United States Patent Office.

VALENTINE T HALL, OF BROOKLYN, NEW YORK.

Letters Patent No. 89,930, dated May 11, 1869.

IMPROVEMENT IN LOCKING-CASE FOR STOP-COCKS.

The Schedule referred to in these Letters Patent and making part of the same.

*To all whom it may concern:*

Be it known that I, VALENTINE T. HALL, of the city of Brooklyn, county of Kings, and State of New York, have invented a new and useful Improvement in Locking-Case for Stop-Cocks and Connections; and I do hereby declare that the following is a full, clear, and exact description thereof, which will enable others skilled in the art to make and use the same, reference being had to the accompanying drawings, forming part of this specification.

This invention relates to a new and improved method of securing stop-cocks and connections for gas, steam, water, and other fluids and liquids; and consists in a case or clasp, formed of one or more parts, which case shall enclose, or partially enclose the stop-cock or connection, and be locked over the same, as will be hereinafter described.

In the accompanying plate of drawings—

Figure 1 represents a longitudinal view of a pipe, with a stop-cock attached, where the stop-cock is enclosed by my improved case, and thus protected, and when the stop-cock is prevented from being turned off or removed from the pipe.

Figure 2 is a cross-section of fig. 1, through the line $x$ $x$.

Figure 3 is a modification of the case, showing it as adapted to protect what is known as the "union," or loose thimble-connection of the pipe with a gas-meter, or similar purpose.

Similar letters of reference indicate corresponding parts.

A is a pipe connected with a reservoir of gas, steam, water, or other fluids or liquids.

B is a strap, connected therewith or attached thereto in any permanent manner. It may be a collar, lug, or flange.

C represents the case or clasp.

In this example of my invention, the case is made in two parts, D and E.

These parts are so formed that they enclose the stop-cock F, as represented.

They are connected at one end by an interior hook and recess.

$g$ is the hook, which is attached to D, and $h$ is a cavity or recess in E.

When the hook is inserted, as seen in drawing, fig. 1, the other ends are brought together and secured around the cock by a padlock, as seen in the drawing.

The case, represented in fig. 3, is united and secured in the same manner, the variation being only in the form of the case, to adapt it to the shape of the "union" joint.

As seen in the drawing, there are holes through each part, so as to allow a padlock to be inserted for locking the parts together, when clasping the cock or joint.

To prevent the stop-cock from being turned or removed from the pipe, there is a pin, J, attached to one of the sides of the case, which pin passes through a hole in the strap B, (or through a fast collar or lug, on the pipe A,) which arrangement prevents the cock from being turned or unscrewed from the pipe.

By connecting the two parts of the case, by an interior fastening, no chance is left for picking or tampering with the case.

The padlock may be burglar-proof, and as secure as such locks can be made.

Having thus described my invention,

I claim as new, and desire to secure by Letters Patent—

The case or clasp C, provided with either an interior hook-fastening, or with a hinge, or other connection, and so constructed that a stop-cock or connection may be secured and prevented from being turned or removed, by applying a padlock to the case, substantially as shown and described.

V. T. HALL.

Witnesses:
FRANK BLOCKLEY,
ALEX. F. ROBERTS.